April 23, 1946.      A. J. BENT      2,398,877
CONTROL VALVE DEVICE
Filed Jan. 29, 1944
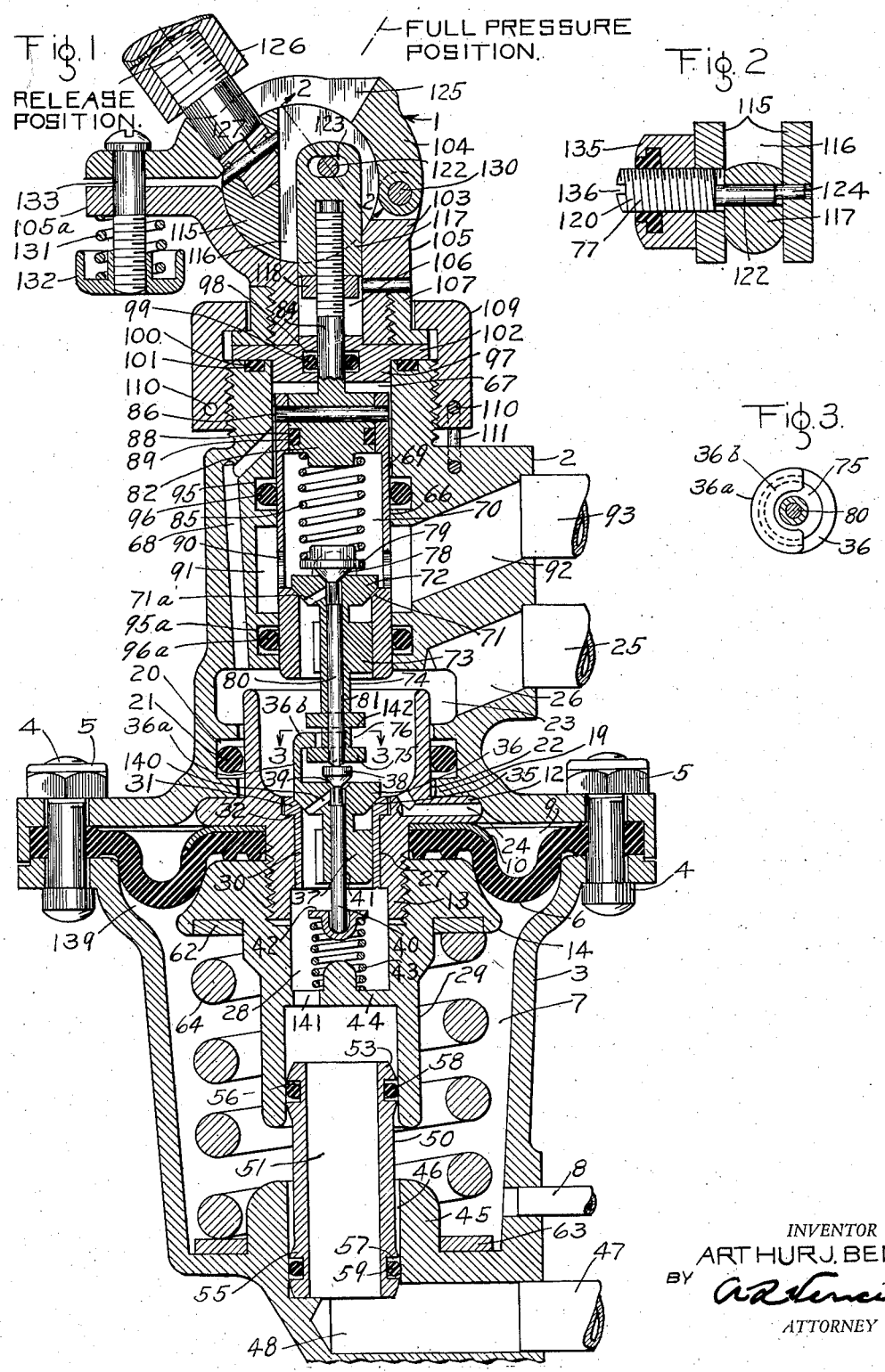
INVENTOR
ARTHUR J. BENT
BY
ATTORNEY Patented Apr. 23, 1946

2,398,877

UNITED STATES PATENT OFFICE 2,398,877

CONTROL VALVE DEVICE

Arthur J. Bent, Wilkinsburg, Pa., assignor to The Westinghouse Air Brake Company, Wilmerding, Pa., a corporation of Pennsylvania Application January 29, 1944, Serial No. 520,289

33 Claims. (Cl. 303—54)

This invention relates to control valve devices of the self-lapping type for use in controlling fluid pressure systems and more particularly to a self-lapping control valve device for use in a fluid pressure airplane control system.

Valve devices employed in fluid pressure airplane control systems must of necessity be light of weight, simple and inexpensive to manufacture with operating parts easily accessible for repair or replacement, and the principal object of the invention is to provide an improved control valve device of this type for use in such systems.

Another object of the invention is to provide an improved self-lapping type control valve device of the above mentioned type which is very sensitive to variations in fluid pressure in controlling the supply of fluid under pressure to and the release of fluid under pressure from a control pipe and which is consequently operative to provide any desired control pipe pressure quickly and accurately.

Another object of the invention is to provide a control valve device having the handle or actuating portion thereof readily adjustable to any chosen position about its axis relative to the body of the device and whereby the actuating portion when positioned may be rigidly locked in place; in other words, to provide a control valve device having an actuating lever portion which may be readily adjustable to any chosen position in a complete circle about its axis without, in any way, affecting any other part or parts of the device.

By reason of this novel arrangement the casing of the device may, without regard to the position of the handle, be secured in any suitable position, after which the handle portion may be readily moved to and locked in the most suitable operating position. Thus the valve device as a whole may be adjusted to suit different mounting conditions without in any way affecting the proper operation of the device.

Still another object of the invention is to provide a control valve device of the above mentioned type having improved and novel means for maintaining the operating handle thereof in any control position to which it is moved, against accidental movement to any other control position. According to this object friction means is provided which is readily adjustable by the operator, to the desired degree sufficient to resist any tendency of the operating handle to move accidentally from any control position to which it has been moved.

A further object of the invention is to provide a control valve device of the above mentioned type having means for attaining and maintaining any chosen predetermined control pressure when the operating handle thereof is disposed in a given position. According to this object, novel adjusting means is provided for regulating the valve mechanism of the control valve device so as to vary the pressure graduating range between any predetermined chosen minimum and maximum pressures in accordance with the position of the operating handle in a variable pressure zone.

A further object of the invention is to provide a control valve device arranged to be controlled either by fluid under pressure or by manually operative means.

A still further object of the invention is to provide a control valve device arranged to be controlled by fluid under pressure or jointly by fluid under pressure and manually.

Still another object of the invention is to provide a control valve device arranged to be controlled by fluid under pressure from a remote control station and having means manually operative from a local station for modifying or varying the pressure of fluid supplied by the device.

Other objects and advantages will appear in the following more detailed description of the invention.

In the accompanying drawing Fig. 1 is a vertical sectional view through a control valve device constructed in accordance with the invention, the device being shown twice its actual size for the sake of clarity, Fig. 2 is a cross sectional view through the device and taken on the line 2—2 of Fig. 1; and Fig. 3 is a cross sectional detail view of a portion of the device taken on the line 3—3 of Fig. 1.

As shown in the accompanying drawing, the control valve device 1 may comprise an upper body casing 2 and a lower body casing 3 which are secured together in any suitable manner, such for instance, as bolts 4 and nuts 5.

A flexible diaphragm 6 is clamped around its edge between the upper and lower body casings 2 and 3, respectively. At one side of the diaphragm 6 there is a chamber 7 which is in constant open communication with a pipe 8 leading to atmosphere and at the opposite side of the diaphragm 6 there is a chamber 9.

Contained in chamber 9 and engaging a wear plate 10 preferably moulded into diaphragm 6 is a diaphragm follower 12. This diaphragm follower is provided with a downwardly extending stem 13 which extends through a central opening in the diaphragm and has screwthreaded engagement with a diaphragm follower 14 contained in chamber 7 and engaging the lower face of the diaphragm, thus the followers 12 and 14 are secured together and to the diaphragm 6.

The inner wall of the upper body casing 2 adjacent the upper face of the diaphragm follower 12 is provided with an annular inwardly projecting shelf or ledge 19 which is provided with a groove or recess 20 in which there is contained a sealing ring 21. This ring contacts the bottom of the groove 20 and the outer wall of a sleeve like portion 22, which extends upwardly from the follower 12, for preventing uncontrolled flow of fluid under pressure between chamber 9 below said ring and a chamber 23 above said ring. Chambers 9 and 23 are, however, in permanent open communication with each other through a passage 24 of restricted flow area, provided in follower 12, for a purpose hereinafter described. Chambers 23 and 9 are therefore in constant open communication with a control pipe 25 by way of a passage 26 provided in the upper body casing 2.

The diaphragm follower 12 is provided with a central bore 27 which connects with an axial aligned bore 28 provided in a downwardly projecting stem 29 projecting from the follower 14. The bore 27 at its upper end is lined, for a portion of its length, with a bushing 30 which is provided at its upper end with a collar 31. This collar engages a stop shoulder 32 provided on the follower, and insures the proper positioning of the bushing 30. This bushing is also provided with a valve seat 35 which is adapted to be engaged by a main release valve 36 for closing communication between the inside of the sleeve like portion 22, which is open at its upper end to chamber 23, and bore 28 in the stem of the follower 14. This main release valve is provided with a downward fluted stem 37 which projects into and is slidably guided by the bushing 30. Also contained in sleeve like portion 22 is a pilot release valve 38 which is adapted to seat on a valve seat 39 provided on the main release valve 36. This pilot valve is also operative to control communication from the inside of sleeve like portion 22 and thereby chamber 23 to the bore 28 in the stem 29 of the follower 14 in a manner hereinafter described. The pilot release valve 38 is provided with a stem 40 which projects downwardly beyond the end of the main release valve fluted stem 37 through a central bore 41 in the main release valve stem 37.

Extending upwardly from the upper surface of the main release valve and preferably formed integral therewith is a semi-circular rib 36a which, at its upper end, is provided with a laterally disposed forked portion 36b which extends in the direction toward the axis of the valve, the space between this forked portion and the upper surface of the valve being provided for the accommodation of a portion of a supply valve member that will be described later.

Contained in bore 28 and engaging the lower end of the pilot release valve stem 40 is a vertically movable spring seat 42 which is maintained in engagement with the stem by a spring 43 interposed between said spring seat and a horizontally disposed wall or rib 44 which extends across the bore 28 of the diaphragm follower stem 29 and which is preferably integral with the follower. This spring at all times exerts a relatively light upwardly directed biasing pressure on the pilot release valve 38 so as to move the valve out of seating engagement with its seat 39 when the several parts of the valve device are positioned as shown in Fig. 1 of the drawing.

The lower end of the diaphragm follower stem 29 is spaced from the upper end of an annular boss 45 which projects upwardly from the bottom wall of the casing 3. This boss is provided with a central bore 46 which is in axial alignment with bore 28 in stem 29 of follower 14 and by way of a passage 48 provided in the casing 3 is in constant open communication with a pipe 47 leading to the atmosphere. Slidably mounted at one end in bore 28 of the diaphragm follower 14 and at its opposite end in bore 46 of the boss 45 is a floating member 50 having a central through passage 51 for establishing communication between bore 28 and bore 46 and thereby passage 48.

The floating member 50 at its upper end is provided with an enlarged exterior portion 53 in the form of a portion of a sphere which portion may slidably and rockably engage the wall of the bore 28 in the follower stem 29. The lower end of the floating member is provided with a similar spherical portion 55 which may slidably and rockably engage the wall of the bore 46 in the boss 45. It will thus be seen that the connections between the floating member 50 and the follower 12 and boss 45 are such as to permit universal movement between the parts so as to eliminate any possibility of binding action being set up between the follower and the member due to cocking of the diaphragm 6 and follower assemblage.

The upper and lower portions 53 and 55 of the member 50 are provided with grooves or recesses 56 and 57, respectively. Contained in grooves 56 and 57 are sealing rings 58 and 59, respectively, each ring contacting the bottom of the groove or recess in which it is disposed and the wall of the bore with which it is associated. These rings prevent leakage of fluid under pressure past either end of the member to chamber 7.

Contained in chamber 7 and interposed between and operatively engaging a spring seat 62, preferably moulded into the lower face of the diaphragm follower 14, and a spring seat 63 carried by the bottom inner wall of the casing 3 is a spring 64. This spring is operative to oppose downward movement of the diaphragm assemblage, including follower 14, diaphragm 6 and diaphragm follower 12, from the position in which it is shown in Fig. 1 of the drawing, as will be later described.

The upper body casing 2 is provided with a central bore 66 which at its lower end is open to chamber 23 and which at its upper end is open to the lower end of a counterbore 67 which is connected to chamber 23 by way of a passage 68. Slidably mounted in this bore is a plunger 69 having a central bore 70 which opens through a valve seat 71, provided adjacent the lower end thereof. This valve seat is provided for engagement by a main supply valve 72 disposed in bore 70. This main supply valve is provided with a fluted stem 73 which extends downwardly through the bore 70 below the valve seat 71 and is provided with an extension 74 which projects into chamber 23. The extension 74 at its lower end is provided with an enlarged annular portion 75 having an exterior groove or recess 76 which is adapted to loosely receive the forked portion 36b of the main release valve 36, thus operatively connecting the main release valve 36 to the main supply valve 72.

It should here be mentioned that there is clearance between the inner edge surface of the forked portion 36b of the main release valve and the bottom of the groove 76 as well as between the upper surface of the forked portion and the upper surface of the groove. This provides a lost motion connection between the main supply valve and the release valve which will insure against the setting up of binding action between the valves and their bushing and between the valves themselves in the event of any unwanted cocking of the diaphragm and follower assemblage. Thus the proper seating and unseating of the valves is insured and possible damage due to the cocking of the diaphragm and follower assemblage is eliminated.

The main supply valve is provided with a pilot supply valve seat 78 for engagement with a pilot supply valve 79. The pilot supply valve 79 is provided with a stem 80 which extends through a central bore 81 in the main supply valve stem and at its end engages the top of the pilot release valve 38.

Interposed between the pilot supply valve 79 and a spring seat member 82 provided on the lower enlarged end portion of an operating stem 84 is a spring 85 which tends, at all times, to urge the pilot supply 79 into engagement with its seat 78. The operating stem 84 is, as shown in Fig. 1 of the drawing, operatively connected to the upper end of the plunger 69 by means of a pin 86. The enlarged end of the stem is also provided with a groove or recess 88 containing an annular sealing ring or gasket 89, which contacts the bottom of the groove and the inner wall of the plunger for preventing leakage of fluid under pressure from bore 70 to the counterbore 67.

Bore 70 within the plunger 69 is in permanent open communication through a plurality of ports 90, provided in the wall of the plunger, with a chamber 91 provided in body casing 2 above chamber 23. Chamber 91 surrounds a portion of the plunger 69 and is in constant open communication by way of a passage 92 with a pipe 93 leading to a source of fluid under pressure, not shown. The casing section 2, intermediate chambers 23 and 91, is provided with a recess or groove 95a containing a sealing ring or gasket 96a which contacts the bottom of the groove and the outer wall of the plunger for preventing leakage of fluid under pressure along the wall of the plunger from chamber 91 above the gasket to chamber 23 below said gasket. The casing section 2 is also provided, intermediate chamber 91 and counterbore 67, with a recess or groove 95 containing a sealing ring or gasket 96 which contact the bottom of the groove and the outer wall of the plunger for preventing leakage of fluid under pressure along said plunger from chamber 91 below the gasket to the counterbore 67 above the gasket.

The operating stem 84 extends upwardly through a central opening in a guide member 97 which rests on the upper end of the body casing and closes the upper end of the counterbore 67. This member is provided with a recess 98 containing a sealing ring 99 which contacts the bottom of the recess and the stem 84 to prevent leakage of fluid under pressure from the counterbore and along the stem to the atmosphere.

The top face of casing section 2 is provided with a recess 100 containing a gasket 101 which contacts the bottom of the recess and the under side of an annular flange 102 carried by the guide member 97 for preventing leakage of fluid under pressure from the counterbore 67 to the atmosphere between the top of the body casing 2 and the member when the member is clamped in position.

Above the body casing 2 there is an operating handle support member 103 comprising an upper part 104 and a lower part 105 which lower part is provided with a suitable opening 106 for accommodating the operating stem 84. The lower part 105 is clamped in position on top of the guide member 97 by means of a flange member 107 rigidly secured to this part of the handle support member and a nut 109 having screw-threaded engagement with the upper end of the body casing 2. The nut 109 at its lower end is provided with a plurality of holes 110 through any one of which a wire 111 carried by the casing section 2 may be threaded, as shown in Fig. 1, for locking the nut in position.

Rotatably mounted in the handle support member 103 is a shaft 115 having a suitable opening 116 arranged to accommodate an adjusting nut 117 and a lock nut 118 which are screwthreaded on the stem 84, the adjusting nut constituting, in effect, an extension of the stem 84.

Carried by the shaft 115 and located at one side of the axis thereof and extending across the opening 116 therein and through the slot 123 of the adjusting nut 117, is an adjusting member 77 which is rockable relative to the shaft for moving the adjusting nut and associated parts vertically relative to the handle support member 103 to effect certain adjustments which will be later described. This adjusting member comprises a screw-threaded portion 120 which has screw-threaded connection with that portion of the shaft which defines one side of the opening 116 and further comprises a portion 122 which is integral with the portion 120 and which extends from the end of portion 120 in a direction across the opening 116 and into the slot 123 of the adjusting nut 117. The diameter of the portion 122 is less than that of portion 120 and its axis is offset from the axis of the portion 120. Integral with the portion 122 and extending from the end thereof into that portion of the shaft 115 defining the other side of the opening 116 is a portion 124 which is of less diameter than the portion 122 and which is axially aligned with the portion 120. From the foregoing description it will be understood that when the member 77 is rocked in one direction the portion 122 thereof will move the adjusting nut and attached parts upwardly relative to the fixed parts of the casing and that when it is rocked in the opposite direction it will move the adjusting nut and associated parts downwardly. The member when it is thus rocked will, due to its screwthreaded connection with the shaft move in the direction of its length but such movement will be of no consequence.

The upper part 104 of the handle support member 103 is provided with an opening 125 through which one end of an operating handle 126 passes, which handle is operatively connected to the shaft 115 by means of a pin 127.

The upper part 104 of the handle supporting member is hinged at one side to the lower part 105 of the member by means of a pivot pin 130 and is maintained in frictional engagement with the shaft 115 by means of a mechanism comprising a spring 131, a spring seat 132 and a bolt 133 which extends through aligned openings formed in the parts 104 and 105. The spring 131 is interposed between a spring seat 105a provided on the lower part 105 of the handle support member and the spring seat 132 located below the spring seat 105a. The spring seat 132 has screwthread engagement with the lower end of the bolt 133. At is upper end the bolt is provided with a head which engages the upper part 104 of the member. From this it will be understood that the spring acts through the medium of the bolt and part 104 to frictionally load the shaft to prevent any unwanted movement thereof from any position to which it has been moved. It will be understood that by turning the screw or the spring seat relative to the other the frictional resistance to rotation of the shaft may be increased or decreased as desired.

If at any time it is desired to change the direction of operation of the operating handle 126 the wire 111 is withdrawn from the opening 110 and then the nut 109 slacked back or loosened so as to release the handle support member 103. The member 103 can now be rotated about its axis relative to the body casing 2 to the new chosen position. When the handle support member is thus positioned, the nut 109 is turned down, clamping said member rigidly in position and the nut is then locked in place by the wire 111. It will be understood that adjustment of the handle support member 103 relative to the body casing 2 may be made without in any way affecting the operating parts of the device, since the connected operating stem 84 and thereby the plunger 69 is free to rotate relative to the main supply valve 78 when the member 103 is moved relative to the body casing 2. The handle support member can be moved through 360° relative to the casing of the device so that regardless of the position in which the casing is mounted the member can be positioned to provide for operation of the operating handle in the desired direction.

It should here be understood that by disengaging the nut 109 from the casing the handle support member 103 and the connected plunger 69 plus the supply and release valve assemblage may be removed from the body casing as a unit, thus permitting either of the valves to be serviced or replaced. This feature also renders it easy and convenient to replace the sealing rings associated with the unit.

*Adjusting the control valve for operation*

When it is desired to obtain some predetermined pressure, such for instance as seventy pounds, in the control pipe 25 and thereby in the connected chambers 23 and 9 of the control valve device 1 upon movement of the operating handle 126 to its maximum pressure position and zero pressure in the control pipe and connected chambers upon movement of said handle to its release position, the handle is first moved from its release position in which it is shown in the drawing to its maximum pressure position in which it engages the right-hand end of the slotted opening in the upper part 104 of the handle support member. With the handle in this position the lock nut 135 on the screw portion 120 of the adjusting member 77 is loosened and a screw driver or the like inserted in a slot 136 provided in the end of the screw and the screw rotated in either a clockwise or counterclockwise direction relative to the shaft 115 until the desired chosen predetermined pressure is attained in chambers 9 and 23 and thereby in the control pipe 25, the eccentric portion 122 of the adjusting member 77 cooperating with the adjusting nut 117 within the slotted opening 123 to effect operation of the supply and release valve as will be hereinafter fully described. It should here be mentioned that the usual pressure gage (not shown) located in the fluid pressure system at the operator's station will indicate when this pressure is attained.

When the chosen predetermined pressure is thus attained in said chambers and control pipe 25, the nut 135 is rotated into engagement with the shaft 115 thus locking the adjusting screw 120 and thereby the eccentric portion 122 of the screw in its adjusted position in the slotted opening 123 in the nut 117. With the eccentric portion 122 thus locked in position it will act as the medium through which force will be transmitted from the shaft 115 to the nut 117 and thereby to the operating stem 84 and plunger 69. The operating handle 126 is then moved in a clockwise direction from its maximum pressure position through a variable pressure zone to the position in which it is shown in the drawing, i. e., its release position in which said handle engages the left hand end of the opening 125. With the operating handle in this position the control pipe pressure should decrease, such decrease being registered by the hereinbefore mentioned pressure gage. If there is not a sufficient reduction in the pressure of fluid in the control pipe 25 upon return of the operating handle to its release position, the supply of fluid under pressure to the control valve device is cut off by the operator and adjusting member 77 removed, after which the nut 109 is loosened and the handle support member 103 removed. With the handle support member removed, lock nut 118 on the stem 84 is loosened after which the member 103 is replaced and the nut 109 tightened to a degree sufficient to hold the member 103 in place, but not so tight as to prevent the member from being rotated relative to the body casing 2. With the handle support member thus assembled the adjusting member 77 is replaced and the handle support member rotated in a clockwise direction relative to the body casing 2 until a decrease in the pressure of fluid in the control pipe is registered on the aforementioned pressure gage, the release of fluid under pressure from the control pipe being by way of a circuit hereinafter traced. It will be understood that since the lock nut 118 is out of engagement with adjusting nut 117, clockwise rotation of the handle support member 103 and thereby the adjusting nut 117 through the medium of adjusting member 77 will cause the plunger 69 to move upwardly. This upward movement of the plunger acting through the main supply valve seat 71 moves the main supply valve 72 and the pilot supply valve 79 in the same direction, thus permitting the spring 43 acting through the medium of stem 40 to unseat the pilot release valve 38 and continued upward movement of the main supply valve will cause the connected main release valve 36 to move out of engagement with its seat 35.

With the plunger 69 and thereby the supply and release valve assemblage thus conditioned the adjusting member 77 is removed and the nut 109 loosened to permit removal of handle support member 103, after which the lock nut 118 is tightened into engagement with the adjusting nut 117 for locking it in its adjusted position. When the adjusting nut is thus locked in its adjusted position, the handle support member 103 is rotated to the desired position for operation of the handle 126 and then clamped in place by the nut 109, which nut is then locked in place by wire 111.

The adjusting member 77 is then repositioned in the shaft and locked in place by the lock nut 135. It will be understood that when the operating handle 126 is moved to its full pressure position a repetition of the adjustment made by the adjusting member 77 may be required to attain the desired maximum pressure.

It will be understood from the foregoing that the adjusting member 77 is operative to adjust the pressure range between some predetermined chosen minimum and maximum pressure and that the adjusting nut 117 is operative to adjust the plunger and thereby a mechanism to attain the desired initial pressure in the control pipe 25 when the handle 126 is positioned in its release position.

If it is desired to maintain some predetermined chosen pressure such for instance eighty pounds in the control pipe 25 and connected valve chambers 9 and 23, respectively, when the operating handle 126 is in its release position and to attain some maximum pressure, such for instance as one hundred fifty pounds, in the control pipe when the handle is moved to full pressure position, the adjustment to obtain the initial pressure may be made first by adjusting nut 117 after which the adjusting screw 120 may be conditioned to obtain the desired maximum pressure with the handle in its maximum pressure position. With the control valve device adjusted as just described, one hundred fifty pounds per square inch should be obtained in the control pipe 25 when the operating handle 126 of the control valve device is moved to the full pressure position and 80 pounds pressure per square inch when the handle is returned to full release position, i. e., the position in which the handle is shown in the drawing. When the handle is moved in the variable pressure control zone between the release position and the full pressure position, the pressure in the control pipe will be varied between eighty and one hundred fifty pounds in accordance with the position of the handle.

Operation

Assuming that pipe 8 and thereby chamber 7 is open to the atmosphere and that the several parts of the control valve device are properly adjusted and positioned as shown in the accompanying drawing, the plunger 69 will be in the position shown so that the main release valve 36 will be in engagement with its seat 35 while spring 43 acting on the end of the pilot release valve stem 40 will maintain the pilot release valve unseated, and spring 85 will maintain the main and pilot supply valves 72 and 79, respectively, seated. With the main and pilot supply valves 72 and 79 thus maintained seated, communication between the bore 70 inside of the plunger 69 and thereby the connected chamber 91 and chamber 23 is closed. With the pilot release valve 38 unseated, communication between chamber 23, connected chamber 9 and control pipe 25 and the atmosphere is established past said valve, through a passage 140 in the main release valve 36, fluted stem 37 of the main release valve 36, bore 28 in the diaphragm follower stem 29, a passage 141 in wall or rib 44, passage 51 in floating member 50, passage 48 and pipe 47.

If, when the fluid pressure supply pipe 93 and thereby chamber 91 and bore 70 within the plunger 69, is charged with fluid under pressure and it is desired to supply fluid under pressure to the control pipe 25, the operating handle 126 of the control valve device is rotated in a clockwise direction from the position in which it is shown, causing the shaft 115 to rotate in the same direction. Since the adjusting member 77 is carried by said shaft and the eccentrically arranged portion 122 of the member engages the nut 117 within slotted opening 123, the plunger 69 is caused to move downwardly from the position in which it is shown in the drawing. The spring 43 acting on the lower end of the pilot release valve stem 40 is considerably lighter than spring 85 acting on the pilot supply valve 79, so that downward movement of the plunger 69, acting through the medium of spring 85, pilot supply valve 79 and pilot supply valve stem 80, causes the pilot release valve 38 to move into engagement with its seat on the main release valve 36 against the opposing pressure of spring 43. With the pilot release valve thus seated, communication between chamber 23 and the atmosphere through the circuit hereinbefore traced will be closed.

Upon movement of the pilot release valve 38 into engagement with its seat 39 said valve becomes stationary, so that continued downward movement of the plunger 69 permits the main supply valve to move downwardly away from the pilot supply valve 79 so that a communication is established between the bore 70 and chamber 23 by way of a passage 71a provided in the main supply valve 72. Fluid under pressure will now flow from bore 70 in plunger 69 and connected chamber 91 past valve 79 at a restricted rate to chamber 23 from whence it flows to the control pipe 25 by way of passage 26. Fluid under pressure supplied to chamber 23 flows through passage 24 in the diaphragm follower 12 at a restricted rate to chamber 9 above the diaphragm 6. The rate of flow of fluid under pressure through passage 24 is such as to prevent the pressure in diaphragm chamber 9 increasing faster than that of the pressure in the control pipe 25. Fluid under pressure supplied to chamber 23 also flows through passage 68 to counterbore 67 and acts on the upper surface of the plunger 69, thus balancing the fluid pressure force acting on opposite ends of said plunger, so that the force required to effect operation of the handle will be reduced to a minimum.

Continued downward movement of the plunger 69 permits the upper wall 142 of the recess 76 to engage with the upper surface of the forked portion 36b carried by the main release valve 36, so that the main supply valve 72 is brought to a stop. When this occurs, the plunger moves downwardly relative to the main supply valve 72 thus moving the main supply valve seat 71 out of engagement with the valve so that a communication of relatively large flow area is established between the bore 70 inside the plunger 69 and chamber 23. With this communication established between bore 70 and chamber 23, fluid under pressure flows from bore 70 and connected supply chamber 91 to chamber 23 and thereby chamber 9 and control pipe 25 at an increased rate.

It should here be understood that if only a slight increase in pressure is desired in the control pipe 25, only the pilot supply valve 79 will be unseated; while if a large increase in fluid under pressure is required in the control pipe, both the pilot and main supply valve will be unseated. By this arrangement it will be seen that the control valve device is operative to provide any desired control pipe pressure quickly and accurately.

The pressure of fluid supplied to chamber 9 acts on diaphragm 6 in opposition to the force of control spring 64, and when this pressure is increased to a degree which overcomes the force of said spring, the diaphragm 6 will deflect downwardly relative to the plunger 69. As the diaphragm 6 is thus deflected downwardly the diaphragm follower 12 and thereby the main and pilot release valves 36 and 38, respectively, which are carried by the follower, are caused to move in the same direction relative to the main supply valve 72 and plunger 69. This permits the main supply valve to move, under the influence of the force of gravity, into seating engagement with its seat 71 and permits the continued downward movement of the pilot supply valve 79 relative to the main valve to its seated position on the main valve. With the supply valves thus seated the supply of fluid under pressure to the chamber 23 is closed off.

When the supply valves 72 and 79 seat as just described, further flow of fluid under pressure from bore 70 and connected supply chamber 91 to chamber 23 is closed off and as a result the downward movement of the diaphragm assemblage including diaphragm follower 12 and thereby the release valves 36 and 38 is stopped by action of spring 64. Since the release valves are maintained closed the several parts of the device are in lap position.

It will be understood from the above description that the degree of pressure attained in the control pipe will now be proportional to the degree of movement of the operating handle 126 in the variable pressure zone and if desired, the maximum degree of pressure may be attained in the control pipe 25 and connected chambers by movement of the operating handle to its full pressure position.

It will here be noted that the diaphragm 6 as it is being deflected downwardly by fluid under pressure supplied to chamber 9 against the opposing force of spring 64, engages an annular shoulder 139 provided on the body casing 2, thus reducing the effective area of the diaphragm as the pressure in chamber 9 is increased. This arrangement permits the use of a spring with a much lower pick up value and also permits the use of a lighter weight spring than would be permissible if the diaphragm did not engage the casing, thus making it possible to reduce the total weight of the valve device.

If, when the several parts of the control valve device have been moved to lap position as above described, it is desired to reduce control pipe pressure the operating handle 126 is moved, in a counter-clockwise direction, to another position in the variable pressure zone between full pressure position and release position. Each successive step of the operating handle in a counter-clockwise direction causes the connected shaft 115 and thereby the member 77 to move in the same direction. This member as it moves in this direction causes the eccentrically arranged portion 122 thereof, acting through the medium of nut 117, to move the plunger 69 and thereby the supply valves 72 and 79 upwardly. With the diaphragm 6 in a balanced condition by the pressure of fluid in chamber 9 and the opposing pressure of spring 64, this upward movement of the plunger 69 and supply valves 72 and 79 will be relative to the release valves 36 and 38. As a result, continued upward movement of the plunger and supply valves 72 and 79 will allow spring 43 to unseat the pilot release valve 38. If upward movement of plunger 69 is continued, the main release valve 36 will be moved upwardly out of engagement with its seat 35 by reason of the engagement of the forked end of portion 36b of the valve by the recessed end portion 75 of the main supply valve 72. It will be understood that if only a slight decrease in control pipe pressure is desired, only the pilot release valve 38 will be unseated, while if a greater reduction is desired, the main release valve 36 will be unseated. In the present showing, the main release valve 36 is seated when the operating handle is in full release position, however, it will be understood from the description in connection with adjusting the control valve device for operation, that if desired, the main release valve may be unseated when the operating handle is disposed in its full release position.

With the pilot release valve unseated, fluid under pressure is released from chamber 23 and thereby chamber 9 and control pipe 25 to the atmosphere past said valve through passage 140 in the main release valve 36, fluted stem 37 of the main release valve 36, bore 28 in the diaphragm follower stem 29, passage 141 in rib 44, passage 51 in floating member 50, passage 48 in the body casing 2 and pipe 47. If the main release valve 36 is unseated fluid under pressure will flow from chamber 23 past the unseated valve to bore 28 in the diaphragm follower stem 29 and thence to the atmosphere through the circuit just traced. The pressure of fluid in diaphragm chamber 9 acting on diaphragm 6 and opposing that of spring 64 will therefore be reduced and said spring will accordingly deflect the diaphragm upwardly in accordance with the degree of such reduction. If the main release valve 36 is seated, and the pilot release valve unseated as shown in the drawing; and the diaphragm 6 and thereby the diaphragm follower 12 is moved upwardly, the pilot release valve seat 39 provided on the main release valve 36 will move in a direction toward the pilot release valve. If, however, the main release valve 36 has been unseated the seat 35 for said valve, which is provided on the follower 12, will move in a direction toward the main valve. In either event movement of diaphragm follower 12 and thereby the seat for the unseated release valve will be in a direction toward the unseated valve.

As the operating handle 126 is being moved in a counterclockwise direction, the pressure of fluid in diaphragm chamber 9 and control pipe 25 will continue to reduce and when the handle is stopped in the variable pressure zone, the release valve or valves as the case may be will seat. This seating of the release valve or valves will prevent further flow of fluid under pressure from chambers 23 and 9 and thereby the control pipes 25, thus limiting the pressure in said pipe and chambers to a degree determined by the position of the operating handle in the variable pressure zone. It will be understood that when the release of fluid under pressure is cut off from chamber 9 the diaphragm assemblage will come to a stop without unseating the pilot release valve 38 so that the valve device is in its lap condition.

To effect a complete release of fluid under pressure from the control pipe 25 and the connected chambers 23 and 9, the operating handle is returned to its release position, i. e., the position in which it is shown in the drawing. As the operating handle 126 and thereby the shaft 115 is being moved to this position, the eccentric portion 122 of the member 77 operates as hereinbefore described to effect unseating of the release valve or valves, thus releasing fluid under pressure from the control pipe and connected chambers. With the handle in this position, a continuous and complete release of fluid under pressure from the control pipe 25 and associated chambers 9 and 23 will occur, the spring 43 maintaining the pilot release valve 38 unseated as shown in the drawing.

From the foregoing description in connection with adjusting the control valve device for operation, it will be understood that if desired, the control valve device may be adjusted to maintain a certain predetermined pressure, such for instance as eighty pounds, in the control pipe when the operating handle 126 is in its release position and operative to obtain some predetermined pressure such for instance one-hundred fifty pounds when the handle is moved to its maximum pressure position. If the control valve device has been adjusted to maintain some predetermined chosen pressure when the operating handle is moved to release position the pilot release valve 38 will be seated so that all valves will be closed and the desired pressure will be maintained in the control pipe and associated chambers.

It will here be understood that when the control valve device is so adjusted, the predetermined chosen pressure in the control pipe and chamber 9 will cause the diaphragm 6 to deflect downwardly against the opposing pressure of spring 64 so that the follower 12 will not be in the position in which it is shown in the drawing, but will be moved downwardly out of engagement with the casing.

To effect a further increase in fluid under pressure in the control pipe 25, the handle 126 of the control valve device is moved in a clockwise direction from its release position and the plunger 69 and the supply and release valve mechanism will operate in the same manner as before described to increase the control pipe pressure, it being understood that upon movement of the handle into its full pressure position the maximum control pipe pressure will be attained.

If, after the control pipe pressure has been increased to some degree above the predetermined chosen initial control pipe pressure, it is desired to reduce the pressure in the control pipe, the handle is moved counterclockwise and the plunger and valve mechanism will operate to reduce the pressure. It will of course be understood that when the handle is moved to the release position the predetermined chosen initial pressure will be maintained in the control pipe.

From the foregoing description it will be understood that the control pipe pressure may be increased or reduced in as many steps or increments as desired, the degree of each step depending upon the extent of the clockwise or counterclockwise rotary movement of the operating handle in the variable pressure zone. It will also be understood that the control valve device may be adjusted to completely vent the fluid pressure from the control pipe or maintain some predetermined pressure in the control pipe when the handle is moved to its release position.

In the foregoing the spring control chamber 7 of the control valve device 1 has been described as being in open communication with the atmosphere, but it is to be understood that fluid under pressure may be supplied to and released from this chamber when it is desired to control the device by fluid under pressure.

In some fluid pressure systems such as employed for controlling airplanes and ships it has been found desirable to control the system from two stations located at remote points from each other. In most of such systems it is desirable to maintain some predetermined pressure such for instance eighty pounds in the control pipe 25 and connected chambers 9 and 23, respectively, when the control valve device is in its release position and to attain some maximum pressure, such for instance one-hundred fifty pounds, in the control pipe when the device is operated to its full pressure position. The control valve device embodying the invention is particularly adapted for use in this type of control system.

Assuming the control valve device is employed in a control system such as just described. In such instances pipe 8 will lead to a remote control station where suitable means may be provided for operation to supply fluid under pressure to and to release fluid under pressure from pipe 8 and connected chamber 7. The control valve device will be adjusted, through the medium of the adjusting nut 117 in the manner hereinbefore described, to obtain the desired initial control pipe pressures.

It will be understood from the foregoing description, that when the control valve device is so adjusted the predetermined chosen initial pressure in the control pipe and chamber 9 will cause the diaphragm 6 to deflect downwardly against the opposing pressure of spring 64 so that the follower 12 will be moved downwardly out of engagement with the casing and the supply and release valves will be lapped to maintain the chosen initial pressure in the control pipe 25. The valve device is now conditioned for operation manually or by fluid under pressure to control the pressure of fluid in the control pipe.

From the foregoing description it will also be understood that with the control valve device conditioned as just described and chamber 7 connected to the atmosphere, by way of pipe 8 and valve means located at a remote control station, the pressure of fluid in the control pipe 25 may be varied between the initial pressure and some predetermined maximum pressure by manipulation of the operating handle 126.

If, with the control valve device conditioned as just described, it is desired to effect operation of the control valve device by fluid under pressure from a remote control station, to increase the pressure of fluid in the control pipe 25, fluid under pressure is admitted to chamber 7 from a remote control station through pipe 8. Fluid under pressure thus supplied to chamber 7 together with spring 64 acts on diaphragm 6 in opposition to the pressure of fluid in chamber 9 and thereby the control pipe 25. Since diaphragm 6 is in a balanced condition by the pressure of fluid in chamber 9 and the opposing pressure of spring 64, an increase in the pressure of fluid in chamber 7 will cause the diaphragm to deflect upwardly relative to the plunger 69. As the diaphragm 6 is thus deflected upwardly, the diaphragm follower 12 and thereby the main and pilot release valves 36 and 38, respectively, which are carried by the follower, are caused to move in the same direction relative to the plunger 69. As a result, continued upward movement of the follower 12 and release valves 36 and 38 acting through the medium of pilot supply valve stem 80 unseats the pilot supply valve 79 against the opposing pressure of spring 85. If upward movement of follower 12 and main and pilot release valves 36 and 38 is continued, the main supply valve 72 will be moved out of engagement with its seat 71 by reason of the engagement of the forked end portion 36b of the main release valve with the upper wall 142 of the recessed end portion 75 of the main supply valve 72. It will be understood that if only a slight increase in control pipe pressure is desired, only the pilot supply valve 79 will be unseated, while if a greater increase is desired, the main supply valve 72 will be unseated.

With the pilot release valve unseated, fluid under pressure flows from bore 70 and connected supply chamber 91 past valve 79 to chamber 23 from whence it flows to chamber 9, counterbore 67 and control pipe 25 through the hereinbefore traced circuits. If the main supply valve is unseated, fluid under pressure will flow from bore 70 past the unseated valve to chamber 23 and thence to the control pipe and connected chambers.

The pressure of fluid supplied to chamber 9 acts on diaphragm 6 in opposition to the combined pressures of control spring 64 and the fluid supplied to chamber 7, and when this pressure is increased to a degree which overcomes the combined pressures of the spring and fluid in chamber 7, the diaphragm will deflect downwardly relative to the plunger 69. As the diaphragm 6 is thus deflected downwardly, the diaphragm follower 12 and thereby the main and pilot release valves 36 and 38, respectively, which are carried by the follower, are caused to move in the same direction relative to the main supply valve 72 and plunger 69. This permits the main supply valve if unseated to move, under the influence of the force of gravity, into seating engagement with its seat 71 and permits the continued downward movement of the pilot supply valve 79 relative to the main valve to its seated position on the main valve. With the supply valve thus seated, the supply of fluid under pressure to the chamber 23 is closed off.

When the supply valves 72 and 79 seat as just described, further flow of fluid under pressure from the supply chamber 91 is closed off and as a result downward movement of the diaphragm assemblage is stopped by the action of spring 64 and the pressure of fluid in chamber 7, thus the several parts of the device assume their lap position.

It will be understood from the above that the pressure of fluid in the control pipe 25 can be increased, above the initial chosen pressure, in such increments as called for by the desired increments of increase in control pressure in chamber 7. The maximum degree of pressure may be provided in said pipe by providing the maximum pressure of fluid in chamber 7.

If, after the control pipe pressure has been increased to some degree above the predetermined chosen initial control pipe pressure, it is desired to reduce the pressure of fluid in the control pipe 25, fluid under pressure is released from chamber 7. When the pressure of fluid in chamber 7 acting on the lower face of diaphragm 6 is sufficiently reduced with respect to the opposing force of fluid under pressure in chamber 9 acting on the opposite face of the diaphragm, the diaphragm assemblage is caused to move downwardly. As the diaphragm assemblage is thus moved downwardly, the main and pilot release valves 36 and 38, respectively, which are carried by the follower, are caused to move in the same direction relative to the main supply valve 72 and plunger 69. As a result, continued downward movement of the diaphragm assemblage will allow spring 43 to unseat the pilot release valve 38. Continued downward movement of the diaphragm assemblage and thereby the main release valve 36 cause the lower surface of the forked portion 36b to engage the lower wall of the recess 76, so that downward movement of the main release valve is brought to a stop. When this occurs, the diaphragm assemblage and thereby the seat 35 for the main release valve moves downwardly relative to the main release valve 36 thus moving the seat 35 out of engagement with the valve.

It will be understood that with the pilot release valve 38 unseated fluid under pressure will be released from the control pipe 25 to the atmosphere past said valve, and that if the main release valve 36 is unseated fluid under pressure will be released from the control pipe 25 to the atmosphere, past said main valve at an increased rate. When the pressure of fluid in the control pipe 25 and connected diaphragm chamber 9 is thus reduced sufficiently with respect to the combined control pressure in chamber 7 and the action of spring 64 the latter pressure deflects diaphragm 6 and thereby the follower 12 upwardly. This upward movement of the diaphragm follower moves the seat 35 for the main release valve 36 in a direction toward the valve until the main release valve is seated after which the main release valve moves with the follower until the seat for the pilot release valve 38 carried thereby engages the pilot valve. This seating of the release valves will prevent further flow of fluid under pressure from chambers 9 and 23 and the connected control pipe 25, thereby limiting the reduction in pressure therein to a degree corresponding to the reduction in pressure in the control fluid pressure in chamber 7. It will of course be understood that when the release of fluid under pressure is cut off from chamber 9 the diaphragm assemblage will come to a stop without unseating the pilot release valve 38 so that the valve device is in its lap condition.

From the foregoing it will be understood that the pressure of fluid in the control pipe 25 may be increased or decreased in as many steps or increments as desired, the degree of each step depending upon the degree of increase or decrease in the pressure of fluid in chamber 7.

It will now be seen that the control valve device 1 may be operated, either manually from a local station by means of the operating handle 126 or by fluid under pressure supplied to and released from chamber 7 through pipe 8 from a remote control station, to vary the pressure of fluid in the control pipe 25 between some predetermined chosen initial pressure and a chosen maximum pressure.

In certain control systems it is desirable to control the control valve device jointly from two different control stations. For instance, on certain airplanes powered by two or more engines it is desirable when the speed of the engines are simultaneously controlled by the pilot, that the engineer be capable of adjusting the speed of one or more of the engines in order to synchronize all of the engines. For example, one of these control valve devices may be provided at the engineer's control station for controlling each engine on the plane. The pipe 8 may lead to the pilot's control station where suitable means, such for instance a control valve device embodying the invention adjusted as shown in the drawing, may be provided for operation by the pilot to supply fluid under pressure to several pipes 8 simultaneously for thereby effecting operation of the devices to simultaneously adjust the speed of the several engines. If the engineer then finds it necessary to either increase or decrease the speed of any one or more of the engines to bring them into synchronism with the other engine or engines, he rotates the handle 126 either clockwise or counter-clockwise, as the case may be, to adjust the position of the plunger 69 relative to the main release valve 36 and thereby vary the pressure in the control pipe 25.

It will be noted that when the control valve device is adjusted for operation jointly by two operators in the manner above described, the operating handle 126 will normally be maintained in some position intermediate release and full pressure position in the variable pressure zone so that movement of the handle in either direction will modify the position of the plunger relative to the main release valve 36.

From the foregoing it will be seen that this control valve device may be controlled by fluid under pressure from a remote control station and that the operating handle 126 may be operated manually to vary or modify the pressure supplied by the device to the control pipe 25.

Having now described my invention what I claim as new and desire to secure by Letters Patent is:

1. In a control valve device, in combination, a chamber, a supply valve for controlling the supply of fluid under pressure to said chamber, a spring for normally maintaining said supply valve seated, a release valve for controlling the release of fluid under pressure from said chamber, another spring for normally maintaining said release valve unseated, said other spring being of less pressure value than said first mentioned spring, a plunger for controlling the operation of said valves, subject on opposite ends to fluid at chamber pressure to balance the plunger, a stem carried by said plunger, means operable to effect operation of said plunger to first seat said release valve and to then unseat said supply valve.

2. In a control valve device, in combination, a chamber, a supply valve for controlling the supply of fluid under pressure to said chamber, a spring for normally maintaining said supply valve seated, a release valve for controlling the release of fluid under pressure from said chamber, another spring for normally maintaining said release valve unseated, said other spring being of less pressure value than said first mentioned spring, a plunger for controlling the operation of said valves, said plunger being subjected at one end to the pressure of fluid in said chamber and being subjected at the other end to the pressure of fluid in another chamber, means for maintaining the pressure of fluid in said chambers and acting on opposite ends of said plunger equalized, and means operable to effect operation of said plunger to first seat said release valve and to then unseat said supply valve.

3. In a control valve device, in combination, a chamber, a main supply valve, a pilot supply valve, each of said supply valves being operative to control the flow of fluid under pressure to said chamber, a main release valve, a pilot release valve, each of said release valves being operative to control the flow of fluid under pressure from said chamber, a plunger movable axially of said main and release valves for controlling the operation of the valves, said main and said pilot supply valves being contained interiorly of said plunger and arranged to cooperate therewith upon operation of said plunger in one direction to first close the main supply valve and then the pilot supply valve and being then operative upon continued operation of said plunger in the same direction to first allow said pilot release valve to open and to then move said main release valve to its open position, and means operative for initiating the operation of said plunger.

4. In a control valve device comprising a body casing having a chamber to which fluid under pressure may be supplied and from which fluid under pressure may be released, in combination, a supply and release valve mechanism contained in said casing operable for varying the supply of fluid under pressure to and the release of fluid under pressure from said chamber, an operating arm support casing secured to said body casing, said support casing having a pivotally connected cover portion, a rotatable shaft mounted in said arm support casing, means operatively connecting said shaft to said supply and release valve mechanism, an operating arm manually operative to actuate said shaft, and means for preventing undesired rotary movement of said shaft, said means comprising a spring and an adjustable nut arranged to cooperate with said pivotally connected cover portion for loading said cover to create frictional resistance to rotary movement of the shaft.

5. In a control valve device comprising a casing having a chamber to which fluid under pressure may be supplied and from which fluid under pressure may be released, in combination, valve means including a supply valve and a release valve operable to control the supply of fluid under pressure to and the release of fluid under pressure from said chamber, a regulating spring, a flexible diaphragm subject to the opposing pressure of said spring and fluid in said chamber, said flexible diaphragm engaging said casing in such a manner upon an increase in pressure in said chamber as to reduce the effective area of said diaphragm, a plunger associated with said supply valve for effecting operation of said valve means to vary the pressure of fluid in said chamber and thereby control the operation of said diaphragm for effecting operation of said valve means to limit either the supply of fluid under pressure to or the release of fluid under pressure from said chamber, and means manually operable for controlling the operation of said plunger.

6. In a control valve device comprising a body casing having a chamber, in combination, a supply and release valve mechanism contained in said body casing and operative for varying the supply of fluid under pressure to and the release of fluid under pressure from said chamber, an operating arm support casing, a shaft rotatably mounted in said support casing, a plunger eccentrically connected to said shaft for operation by the shaft to control the operation of said valve mechanism, an arm for actuating said shaft, said support casing being adjustable to vary the position of said shaft and arm with relation to the body casing, and means for clamping said arm support casing in any desired position to which it has been moved without in any way affecting the control and operation of said valve mechanism.

7. In a control valve device comprising a body casing having a chamber, in combination, a supply and release valve mechanism contained in said body casing and operative for varying the supply of fluid under pressure to and the release of fluid under pressure from said chamber, an operating arm support casing containing a rotatable shaft operative to control the operation of said valve mechanism, an arm for actuating said shaft, said support casing being adjustable to vary the position of said arm with relation to the body casing, a nut for clamping said arm support casing rigidly to said body casing in any position to which it has been moved, and means for locking said nut in its clamped position.

8. In a control valve device comprising a body casing having a chamber, in combination, a supply and release valve mechanism contained in said body casing and operative for varying the supply of fluid under pressure to and the release of fluid under pressure from said chamber, an operating arm support casing containing a rotatable shaft operative to control the operation of said valve mechanism, an arm operatively connected to said shaft and operable to actuate said shaft, and a nut having screwthreaded engagement with said body casing and engaging said support casing and operative to clamp said support casing to said body casing in any chosen position with relation to said body casing.

9. In a control valve device comprising a body casing having a chamber, in combination, a supply and release valve mechanism contained in said body casing and operative for varying the supply of fluid under pressure to and the release of fluid under pressure from said chamber, an operating arm support casing, shaft rotatably mounted in said support casing, a plunger slidably guided in said body casing and support casing and operative by said shaft to control the operation of said valve mechanism, said plunger being operatively connected to the shaft at a point located at one side of the axis of the shaft, and said support casing, shaft and plunger being rotatable to any chosen position in a complete circle relative to said body casing without in any way affecting the operation of any part of the device, means for clamping and locking said support casing to said body casing in the chosen position, and an operating arm for actuating said shaft.

10. In a self-lapping control valve device of the type having a casing in which there is provided a fluid pressure discharge passage, the combination with a flexible diaphragm mounted in said casing and being arranged to flex vertically upwardly and downwardly and having at one side a chamber to which fluid under pressure may be supplied and from which fluid under pressure may be released, of follower means secured to said diaphragm and having a discharge passage through which fluid under pressure may be released from said chamber, a tubular member rockably and slidably mounted in said follower means and casing to accommodate the vertical movement of said diaphragm and thereby the follower means and to compensate for unwanted tilting movement of the follower means from its vertical paths of travel, to prevent binding action between the parts, said member establishing an always open communication from the second mentioned passage to the first mentioned passage, and means for maintaining leak-proof the joints between said tubular member and the follower means and casing.

11. In a self-lapping control valve device of the type having a casing in which there is provided a fluid pressure discharge passage, the combination with a flexible diaphragm mounted in said casing and being arranged to flex vertically upwardly and downwardly and having at one side a chamber to which fluid under pressure may be supplied and from which fluid under pressure may be released, of follower means secured to said diaphragm and having a discharge passage through which fluid under pressure may be released from said chamber, a tubular member rockably and slidably mounted in said follower means and casing to accommodate the vertical movement of said diaphragm and thereby the follower means and to compensate for unwanted tilting movement of the follower means from its vertical path of travel, to prevent binding action between the parts, said member establishing an always open communication from the second mentioned passage to the first mentioned passage, and sealing means carried by said member for maintaining leak-proof the joints between said tubular member and the follower means and casing.

12. In a self-lapping control valve device of the type having a casing in which there is provided a fluid pressure discharge passage, the combination, with a flexible diaphragm mounted in said casing and being arranged to flex vertically upwardly and downwardly, and having at each side a chamber to which fluid under pressure may be supplied and from which fluid under pressure may be released, of follower means secured to said diaphragm having a discharge passage through which fluid under pressure may be released from one of said chambers, a tubular member disposed in the other chamber, said member being rockably and slidably mounted in said follower means and casing to accommodate the vertical movement of said diaphragm and thereby the follower means and to compensate for unwanted tilting movement of the follower means from its intended path of travel, to prevent binding action between the parts, said member establishing an always open communication from the second mentioned passage to the first mentioned passage, and means for maintaining leak-proof the joints between said member, follower means and casing.

13. In a control valve device, the combination with a casing having a chamber to which fluid under pressure may be supplied and from which fluid under pressure may be released, of a spring, a movable abutment subject to the opposing pressures of said spring and fluid in said chamber and being arranged to flex vertically upwardly and downwardly, a release valve for releasing fluid under pressure from said chamber, said release valve being mounted in and carried by said movable abutment, a plunger spaced from and movable axially relative to said abutment, a supply valve for controlling the supply of fluid under pressure to said chamber, said supply valve being mounted in and carried by said plunger in axial alignment with said release valve, a lost motion connection operatively connecting said valves together and being operable to prevent binding action between the valves in the event that the movable abutment and thereby the release valve tilts from its intended vertical path of travel, and means operable to effect operation of said plunger.

14. In a control valve device, in combination, a chamber, a pair of coaxially aligned valves arranged to seat in the same direction, one of said vaves being arranged to control a communication through which fluid under pressure may be supplied to said chamber and the other being arranged to control a communication through which fluid under pressure may be released from said chamber, a plunger movable axially of said valves having a seat for said one valve and operable upon movement into engagement with said one valve to close the communication controlled thereby and being then operable to effect movement of said other valve to open the communication controlled thereby, a lost motion connection for operatively connecting said one valve to said other valve to insure against binding action between said valves in the event that either of said valves tilt from their intended path of travel, and means operable to effect operation of said plunger.

15. In a self-lapping control valve device of the type having a casing, the combination, with a movable abutment mounted in said casing and being arranged to move vertically upwardly and downwardly and having at one side a chamber to which fluid under pressure may be supplied and from which fluid under pressure may be released, of a supply valve for controlling the supply of fluid under pressure to said chamber, a release valve disposed in axial alignment with said supply valve and operative to engage a seat on said abutment to close off the release of fluid under pressure from said chamber, a lost motion connection for operatively connecting said valves together and arranged to prevent binding action between said valves upon operation of said abutment in the event that said abutment tilts from its intended path of travel.

16. In a self-lapping control valve device of the type having a casing in which there is provided a fluid pressure discharge passage, the combination, with a flexible diaphragm mounted in said casing and being arranged to flex vertically upwardly and downwardly and having at one side a chamber to which fluid under pressure may be supplied and from which fluid under pressure may be released, of follower means secured to said diaphragm having a valve seat surrounding a discharge passage through which fluid under pressure may be released from said chamber, a release valve disposed in axial alignment with said follower and adapted to engage said seat to close off the release of fluid under pressure from said chamber, a supply valve arranged in axial alignment with said release valve and operable to control the supply of fluid under pressure to said chamber, a lost motion connection for connecting said valves together to prevent binding action between said valves, in the event that the follower means and release valve tilt from their intended vertical path of travel, and a tubular member rockably and slidably mounted in said follower means and said casing to accommodate the vertical movement of said diaphragm and thereby the follower means and to compensate for unwanted tilting movement of the follower means and diaphragm to prevent binding action between the parts in the event that the follower means and diaphragm tilt from their intended vertical path of travel and to establish an always open communication from the second mentioned passage ot the first mentioned passage.

17. In a self-lapping control valve device of the type having a casing in which there is provided a fluid pressure discharge passage, the combination, with a flexible diaphragm mounted in said casing and being arranged to flex vertically upwardly and downwardly and having at one side a chamber to which fluid under pressure may be supplied and from which fluid under pressure may be released, of follower means secured to said diaphragm having a valve seat surrounding a discharge passage through which fluid under pressure may be released from said chamber, a release valve disposed in axial alignment with said follower and adapted to engage said seat to close off the release of fluid under pressure from said chamber, a supply valve arranged in axial alignment with said release valve and operable to control the supply of fluid under pressure to said chamber, a lost motion connection for connecting said valves together to prevent binding action between said valves in the event that the follower means and release valve tilt from their intended vertical path of travel, a tubular member rockably and slidably mounted in said follower means and said casing to accommodate the vertical movement of said diaphragm and thereby the follower means and to compensate for unwanted tilting movement of the follower means and diaphragm to prevent binding action between the parts in the event that the follower means and diaphragm tilt from their intended vertical path of travel and to establish an always open communication from the second mentioned passage, and means for maintaining leak-proof the joints between said tubular member and the follower means and casing.

18. In a control valve device comprising a casing having a pressure chamber to which fluid under pressure may be supplied and from which fluid under pressure may be released, in combination, a control chamber, a movable abutment subject to pressure of fluid in said pressure chamber and an opposing pressure in said control chamber and operative upon an increase in said opposing pressure to provide an increase in the pressure of fluid in said pressure chamber and upon a reduction in said opposing pressure to release fluid under pressure from said pressure chamber to reduce the pressure therein, valve means including a supply valve and a release valve operable by said abutment to control the supply of fluid under pressure to and the release of fluid under pressure from said pressure chamber, a plunger associated with said supply valve for also effecting operation of said valve means to vary the pressure of fluid in said pressure chamber and thereby control the operation of said abutment for effecting operation of said valve means to limit either the supply of fluid under pressure to or the release of fluid under pressure from said chamber, and means manually operative to actuate said plunger.

19. In a control valve device comprising a casing having a pressure chamber to which fluid under pressure may be supplied and from which fluid under pressure may be released, in combination, a control chamber, a spring disposed in said control chamber, a movable abutment subject to pressure of fluid in said pressure chamber and to the opposing pressure of either said spring or both said spring and of fluid under pressure in said control chamber and operable to provide fluid in said pressure chamber at a pressure proportional to said opposing pressure in said control chamber, a pipe through which fluid under pressure is supplied or released to vary the pressure of fluid in said control chamber, valve means including a supply valve and a release valve operable by said abutment to control the supply of fluid under pressure to and the release of fluid under pressure from said pressure chamber, a plunger associated with said supply valve for also effecting operation of said valve means to vary the pressure of fluid in said pressure chamber and thereby control the operation of said abutment for effecting operation of said valve means to limit either the supply of fluid under pressure to or the release of fluid under pressure from the pressure chamber, and means operable to actuate said plunger.

20. In a control valve device having a pressure chamber to which fluid under pressure may be supplied and also having a control chamber to which fluid under pressure may be supplied, a movable valve seat, a supply valve for engagement with said valve seat, means operative manually to move said valve seat away from said valve to supply fluid under pressure to said chamber, a movable abutment subject to the pressures of fluid in the pressure and control chambers and operative upon an increase in the pressure of fluid in said control chamber to move said valve away from said valve seat to supply fluid under pressure to said pressure chamber.

21. In a control valve device having a pressure chamber to which fluid under pressure may be supplied and also having a control chamber to which fluid under pressure may be supplied, a movable valve seat, a supply valve for engagement with said valve seat, means operative manually to move said valve seat away from said valve to supply fluid under pressure to said chamber, a movable abutment subject to the pressures of fluid in the pressure and control chambers and operative upon an increase in the pressure of fluid in said control chamber to move said valve away from said valve seat to supply fluid under pressure to said pressure chamber, said movable abutment being operative when the pressure of fluid in said pressure chamber increases over the opposing pressure acting on the abutment for effecting movement of said valve into engagement with said valve seat to cut-off the flow of fluid to said pressure chamber.

22. In a control valve device having a pressure chamber to which fluid under pressure may be supplied and from which fluid under pressure may be released and also having a control chamber to which fluid under pressure may be supplied and from which fluid under pressure may be released, a movable supply valve seat, a supply valve for engagement with said supply valve seat, a movable abutment subject to the opposing pressures of fluid in said pressure and control chambers, a release valve seat carried by said abutment, a release valve for engagement with said release valve seat, and being operatively connected with said supply valve, and manual means operative for moving said supply valve seat away from said supply valve to supply fluid under pressure to said pressure chamber, said movable abutment being responsive to an increase in the pressure of fluid in said control chamber for moving said supply valve away from the supply valve seat, said manual means being operative to move said supply valve seat, supply valve and release valve relative to the release valve seat to release fluid under pressure from said pressure chamber.

23. In a control valve device having a pressure chamber to which fluid under pressure may be supplied and from which fluid under pressure may be released and also having a control chamber to which fluid under pressure may be supplied and from which fluid under pressure may be released, a movable supply valve seat, a supply valve for engagement with said supply valve seat, a movable abutment subject to the opposing pressures of fluid in said pressure and control chambers, a release valve seat carried by said abutment, a release valve for engagement with said release valve seat and being operatively connected with said supply valve, and manual means operative for moving said supply valve seat away from said supply valve to supply fluid under pressure to said pressure chamber, said movable abutment being responsive to an increase in the pressure of fluid in said control chamber for moving said supply valve away from the supply valve seat, said manual means being operative to move said supply valve seat, supply valve and release valve relative to the release valve seat to release fluid under pressure from said pressure chamber, and said movable abutment being responsive to the reduction in the pressure of fluid in said pressure chamber, occasioned by the release of fluid therefrom, to move said release valve seat into engagement with the release valve to cut off the release flow of fluid from the pressure chamber.

24. In a control valve device having a pressure chamber to which fluid under pressure may be supplied and from which fluid under pressure may be released and also having a control chamber to which fluid under pressure may be supplied and from which fluid under pressure may be released, a movable supply valve seat, a supply valve for engagement with said supply valve seat, a movable abutment subject to the opposing pressures of fluid in said pressure and control chambers, a release valve seat carried by said abutment, a release valve for engagement with said release valve seat, and being operatively connected with said supply valve, said movable abutment being responsive to an increase in the pressure of fluid in said control chamber for moving said supply valve away from the supply valve seat to supply fluid under pressure to said pressure chamber and being responsive to a reduction in the pressure of fluid in said control chamber for moving said release valve seat away from said release valve to release fluid under pressure from said pressure chamber, and manual means operative for moving said supply valve seat away from said supply valve to supply fluid under pressure to said pressure chamber and being operative to move said supply valve seat, supply valve and release valve relative to the release valve seat to release fluid under pressure from said pressure chamber.

25. In a control valve device having a pressure chamber to which fluid under pressure may be supplied and from which fluid under pressure may be released and also having a control chamber to which fluid under pressure may be supplied and from which fluid under pressure may be released, a movable supply valve seat, a supply valve for engagement with said supply valve seat, a movable abutment subject to the opposing pressures of fluid in said pressure and control chambers, a release valve seat carried by said abutment, a release valve for engagement with said release valve seat and being operatively connected with said supply valve, said movable abutment being responsive to an increase in the pressure of fluid in said control chamber for moving said supply valve away from the supply valve seat to supply fluid under pressure to said pressure chamber and being responsive to a reduction in the pressure of fluid in said control chamber for moving said release valve seat away from said release valve to release fluid under pressure from said pressure chamber, and manual means operative for moving said supply valve seat away from said supply valve to supply fluid under pressure to said pressure chamber and being operative to move said supply valve seat, supply valve and release valve relative to the release valve seat to release fluid under pressure from said pressure chamber, and said movable abutment being responsive to the reduction in the pressure of fluid in said pressure chamber, occasioned by the release of fluid therefrom, to move said release valve seat into engagement with the release valve to cut off the release flow of fluid from the pressure chamber.

26. In a control valve device having a pressure chamber to which fluid under pressure may be supplied and from which fluid under pressure may be released and also having a control chamber to which fluid under pressure may be supplied and from which fluid under pressure may be released, a plunger having a supply valve seat, a supply valve for engagement with said supply valve seat, a flexible diaphragm subject to the opposing pressures of fluid in said pressure and control chambers, a diaphragm follower carried by said diaphragm having a release valve seat, a release valve for engagement with said release valve seat and being disposed in axial alignment with said supply valve, a lost motion connection for operatively connecting said supply valve and release valves together, said diaphragm being responsive to an increase in the pressure of fluid in said control chamber for moving through the medium of said follower and said release valve said supply away from the supply valve seat on said plunger to supply fluid under pressure to said pressure chamber and being responsive to a reduction in the pressure of fluid in said control chamber for moving said follower and thereby said release valve seat away from said release valve to release fluid under pressure from said pressure chamber, and manual means operative for moving said plunger and thereby said supply valve seat away from said supply valve to supply fluid under pressure to said pressure chamber and being operative to move through the medium of said plunger and thereby said supply valve seat and supply valve the release valve away from the release valve seat to release fluid under pressure from said pressure chamber.

27. In a control valve device comprising a casing having a fluid pressure discharge passage, a fluid pressure chamber to which fluid under pressure may be supplied and from which fluid under pressure may be released and a control chamber to which fluid under pressure may be supplied and from which fluid under pressure may be released, in combination, valve means operative to vary the pressure of fluid in said pressure chamber, manually operative means for actuating said valve means, movable abutment means subject to the opposing pressure of fluid in said pressure and control chambers and operative upon variations in the pressure of fluid in the control chamber for effecting operation of said valve means, said movable abutment means having a passage through which fluid under pressure may be released from said pressure chamber, a tubular member disposed in said control chamber, said member being rockably and slidably mounted in said abutment means and casing to compensate for unwanted tilting movement of the abutment from its intended path of travel to prevent binding action between the parts, said member establishing an always open communication from the second mentioned passage to the first mentioned and means for maintaining leak-proof the joints between said member, abutment means and casing.

28. In a self-lapping control valve device comprising a casing having formed therein two pressure chambers, a movable abutment separating said chambers and being subject to the opposing pressures of fluid in said chambers, a fluid conducting passage in said casing extending from one of said chambers through said movable abutment and through the other of said chambers and comprising a fluid conduit providing an air-tight connection within said fluid conducting passage, said fluid conduit being yieldable to the movement of said movable abutment, and valve means associated with said movable abutment for controlling the flow of fluid under pressure through said fluid conduit.

29. In a fluid pressure control device, in combination, a casing, a movable abutment in said casing having at one side a fluid pressure control chamber, fluid conducting means having a passage terminating in an opening at the opposite side of said abutment, tubular means connected at one end to said movable abutment and at the other end to said fluid conducting means providing for the flow of fluid between said chamber and said passage, the connections between the tubular means and the movable abutment and between the tubular means and the fluid conducting means being leak-proof and comprising means operative to compensate for unwanted movement of said abutment from its axial path of travel.

30. In a fluid pressure control device, in combination, a casing, a movable abutment in said casing having at one side a fluid pressure control chamber, fluid conducting means having a passage terminating in an opening at the opposite side of said abutment, tubular means connected at one end to said movable abutment and at the other end to said fluid conducting means providing for the flow of fluid between said chamber and said passage, sealing means for preventing leakage past the connections between the tubular means and the movable abutment and between the tubular means and the fluid conducting means and comprising means operative to compensate for unwanted movement of said abutment from its axial path of travel.

31. In a self-lapping control valve device of the type having a casing in which there is provided a fluid pressure conducting passage, the combination with a movable abutment mounted in said casing and having at one side a fluid pressure chamber of annular means establishing a communication which is open to said chamber and which extends through said abutment, a tubular member rockably and slidably associated with said annular means and the casing to accommodate axial movement of said movable abutment and compensate for unwanted movement of the movable abutment from its axial path of travel and thereby prevent binding action between the parts, said tubular member establishing an always open communication from said chamber to said passage and sealing means for maintaining leak-proof joints between said movable abutment, said tubular member and said casing.

32. In a control valve device, in combination, a chamber, a supply valve for controlling the supply of fluid under pressure to said chamber, a release valve for controlling the release of fluid under pressure from said chamber, a plunger for controlling the operation of said valves, one end of said plunger extending into and being subjected to the pressure of fluid in said chamber, and a fluid conduit through which fluid under pressure flows from said chamber to act on the other end of said plunger and thereby balance the plunger.

33. In a control valve device, in combination, a casing, a fluid pressure supply chamber, another chamber to which fluid under pressure may be supplied from said supply chamber, a supply valve for controlling the supply of fluid to said other chamber, a release valve for controlling the release of fluid under pressure from said other chamber, a plunger operative to control the operation of said valves, said plunger extending through said supply chamber and having one end exposed to said other chamber, a balancing chamber to which the other end of said plunger is exposed, an always open conduit connecting said other chamber and said balancing chamber, a chamber formed in said plunger always open to said supply chamber, a passage in said plunger through which fluid under pressure may flow from the chamber in said plunger and thereby from said supply chamber to said other chamber, a valve seat encircling said passage and with which said supply valve is arranged to cooperate to control the flow of fluid through said passage, means interposed between and engaging said casing and plunger to effect an air-tight seal between said supply and said other chamber, and means interposed between and engaging said casing and plunger to effect an air-tight seal between said supply chamber and said balancing chamber.

ARTHUR J. BENT.